US012711140B2

(12) United States Patent
Zhou et al.

(10) Patent No.: US 12,711,140 B2
(45) Date of Patent: Aug. 18, 2026

(54) SYSTEMS AND METHODS FOR OBJECT TYPE SELECTIONS

(71) Applicant: Palantir Technologies Inc., Denver, CO (US)

(72) Inventors: Vicky Zhou, Brooklyn, NY (US); Michael Ryan, London (GB); Abhishek Agarwal, Reading (GB); Lior Kaminer, Ramat Hasharon (IL); Alexandru-Liviu Bratosin, London (GB)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 18/921,869

(22) Filed: Oct. 21, 2024

(65) Prior Publication Data

US 2026/0056958 A1 Feb. 26, 2026

Related U.S. Application Data

(60) Provisional application No. 63/687,069, filed on Aug. 26, 2024.

(51) Int. Cl.

| | |
|---|---|
| ***G06F 17/00*** | (2019.01) |
| ***G06F 7/00*** | (2006.01) |
| ***G06F 16/2457*** | (2019.01) |
| ***G06F 16/248*** | (2019.01) |

(52) U.S. Cl.

CPC ...... *G06F 16/24578* (2019.01); *G06F 16/248* (2019.01)

(58) Field of Classification Search

CPC ......................... G06F 16/24578; G06F 16/248

USPC .......................................................... 707/723

See application file for complete search history.

(56) References Cited

U.S. PATENT DOCUMENTS

| | | | | |
|---|---|---|---|---|
| 10,839,010 | B2 * | 11/2020 | Srivastava | G06F 16/24578 |
| 11,106,459 | B2 | 8/2021 | Gu | |
| 11,321,054 | B2 | 5/2022 | Gaitonde | |
| 11,645,492 | B2 | 5/2023 | Lambert | |
| 11,977,878 | B2 * | 5/2024 | Biesdorf | G06F 8/70 |
| 12,020,025 | B1 * | 6/2024 | Zhang | G06F 8/433 |
| 2013/0054583 | A1 * | 2/2013 | Macklem | G06F 16/22 707/723 |
| 2014/0032563 | A1 * | 1/2014 | Lassen | G06F 16/221 707/741 |
| 2022/0365774 | A1 * | 11/2022 | Biesdorf | G06F 8/36 |
| 2023/0252224 | A1 * | 8/2023 | Tran | G06F 40/56 715/256 |

(Continued)

*Primary Examiner* — Pavan Mamillapalli

(74) *Attorney, Agent, or Firm* — Faegre Drinker Biddle & Reath LLP

(57) ABSTRACT

In some examples, systems and methods for selecting object types and/or managing object models are provided. For example, a method includes: receiving a search query related to a use case; searching one or more ontologies based on the search query to generate a list of object types, the list of object types including one or more object type groups, each object type group of the one or more object type groups including a set of pre-selected object types; ranking the list of object types based on one or more ranking criteria; generating a presentation representing the list of object types based at least in part on the ranking; and causing a display of the presentation representing the list of object types.

20 Claims, 7 Drawing Sheets

(56) References Cited

U.S. PATENT DOCUMENTS

2023/0273790 A1* 8/2023 Belardo .................... G06F 8/36
717/107
2023/0273800 A1* 8/2023 Hill ......................... G06F 8/436
713/2
2024/0281671 A1* 8/2024 Phokela ................. G06N 5/022
2025/0036291 A1* 1/2025 Morales ................ G06F 3/0659

* cited by examiner 300
340
340A
340B
340N
310
327
Object Model Management Processor 320
330
Training Dataset 332

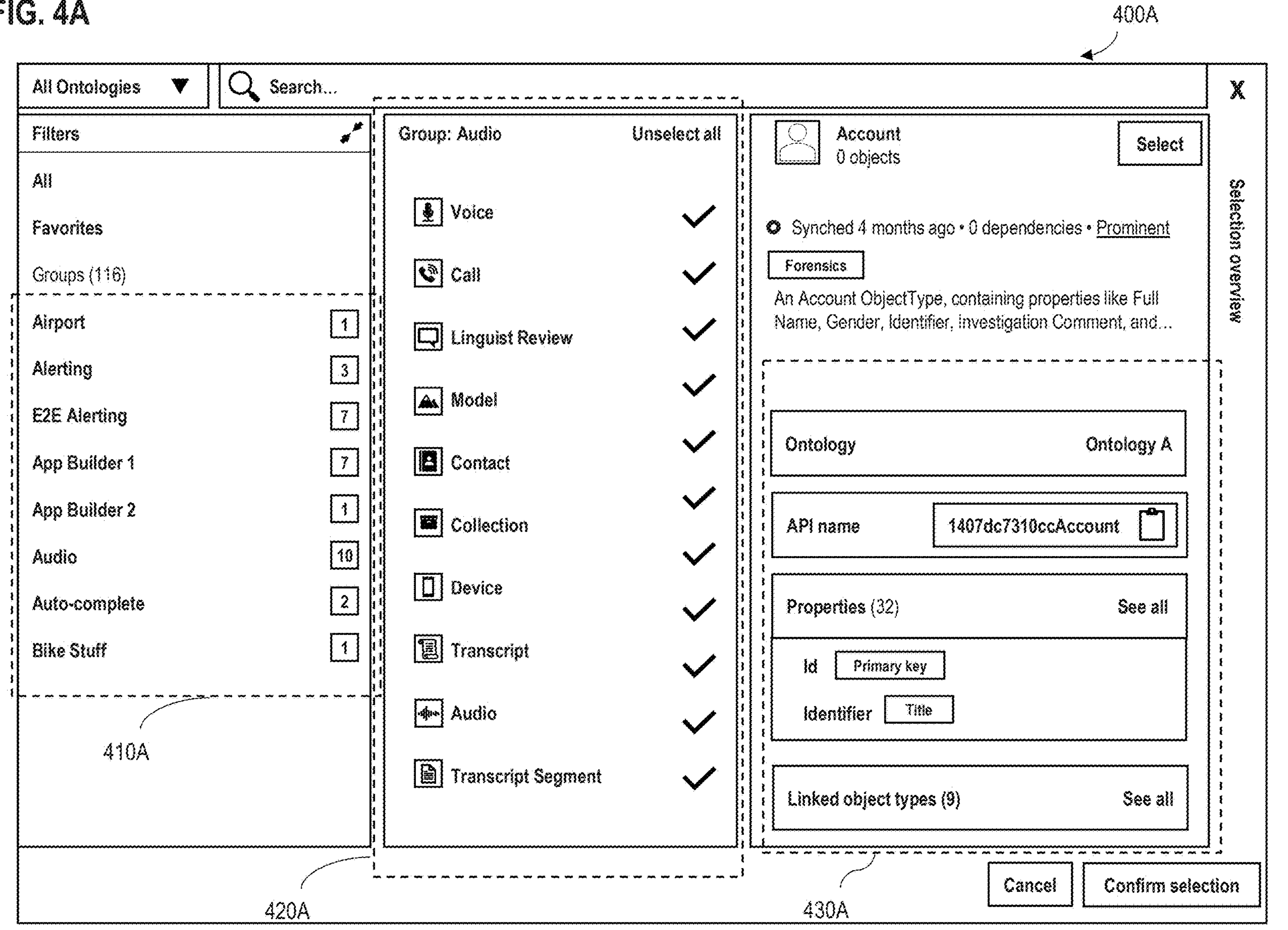
FIG. 4A
400A
All Ontologies
Search...
Filters
All
Favorites
Groups (116)
Airport
1
Alerting
3
E2E Alerting
7
App Builder 1
7
App Builder 2
1
Audio
10
Auto-complete
2
Bike Stuff
1
410A
Group: Audio
Unselect all
Voice
Call
Linguist Review
Model
Contact
Collection
Device
Transcript
Audio
Transcript Segment
420A
Account
0 objects
Select
Selection overview
Synched 4 months ago • 0 dependencies • Prominent
Forensics
An Account ObjectType, containing properties like Full Name, Gender, Identifier, investigation Comment, and...
Ontology
Ontology A
API name
1407dc7310ccAccount
Properties (32)
See all
Id
Primary key
Identifier
Title
Linked object types (9)
See all
430A
Cancel
Confirm selection

SYSTEMS AND METHODS FOR OBJECT TYPE SELECTIONS

This application claims priority U.S. Provisional Application No. 63/687,069, filed Aug. 26, 2024, which is incorporated in its entirety by reference herein for all purposes.

FIELD

Certain embodiments of the present disclosure relate to object model management. More particularly, some embodiments of the present disclosure relate to object model management for building software applications.

BACKGROUND

Organizations often use complex object models in software systems, for example, object models including a number of object types. Organizations are often attempting to operationalize their data using low-code and/or no-code application builders. In some examples, application builders are software tools that can use various software components to build customized software applications. These tools enable users who lack software engineering skills to create tailored applications that help solve business needs, for example.

Hence, it is desirable to improve techniques for managing object models.

SUMMARY

Certain embodiments of the present disclosure relate to object model management. More particularly, some embodiments of the present disclosure relate to object model management for building software applications.

At least some embodiments are directed to a method for selecting object types. In certain embodiments, the method includes: receiving a search query related to a use case; searching one or more ontologies based on the search query to generate a list of object types, the list of object types including one or more object type groups, each object type group of the one or more object type groups including a set of pre-selected object types; ranking the list of object types based on one or more ranking criteria; generating a presentation representing the list of object types based at least in part on the ranking; and causing a display of the presentation representing the list of object types; wherein the method is performed by one or more processors.

At least some embodiments are directed to a system for selecting object types, the system comprising: one or more memories comprising instructions stored thereon; and one or more processors configured to execute the instructions and perform operations comprising: receiving a search query related to a use case; searching one or more ontologies based on the search query to generate a list of object types, the list of object types including one or more object type groups, each object type group of the one or more object type groups including a set of pre-selected object types; ranking the list of object types based on one or more ranking criteria; generating a presentation representing the list of object types based at least in part on the ranking; and causing a display of the presentation representing the list of object types.

At least some embodiments are directed to a non-transitory computer-readable storage medium having instructions for selecting object types that, when executed by one or more processors, cause the one or more processors to perform operations comprising: receiving a search query related to a use case; searching one or more ontologies based on the search query to generate a list of object types, the list of object types including one or more object type groups, each object type group of the one or more object type groups including a set of pre-selected object types; ranking the list of object types based on one or more ranking criteria; generating a presentation representing the list of object types based at least in part on the ranking; and causing a display of the presentation representing the list of object types.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 4A is an illustrative example user interface including a presentation representing object type groups, according to some embodiments of the present disclosure.

DETAILED DESCRIPTION

Figure 1A:
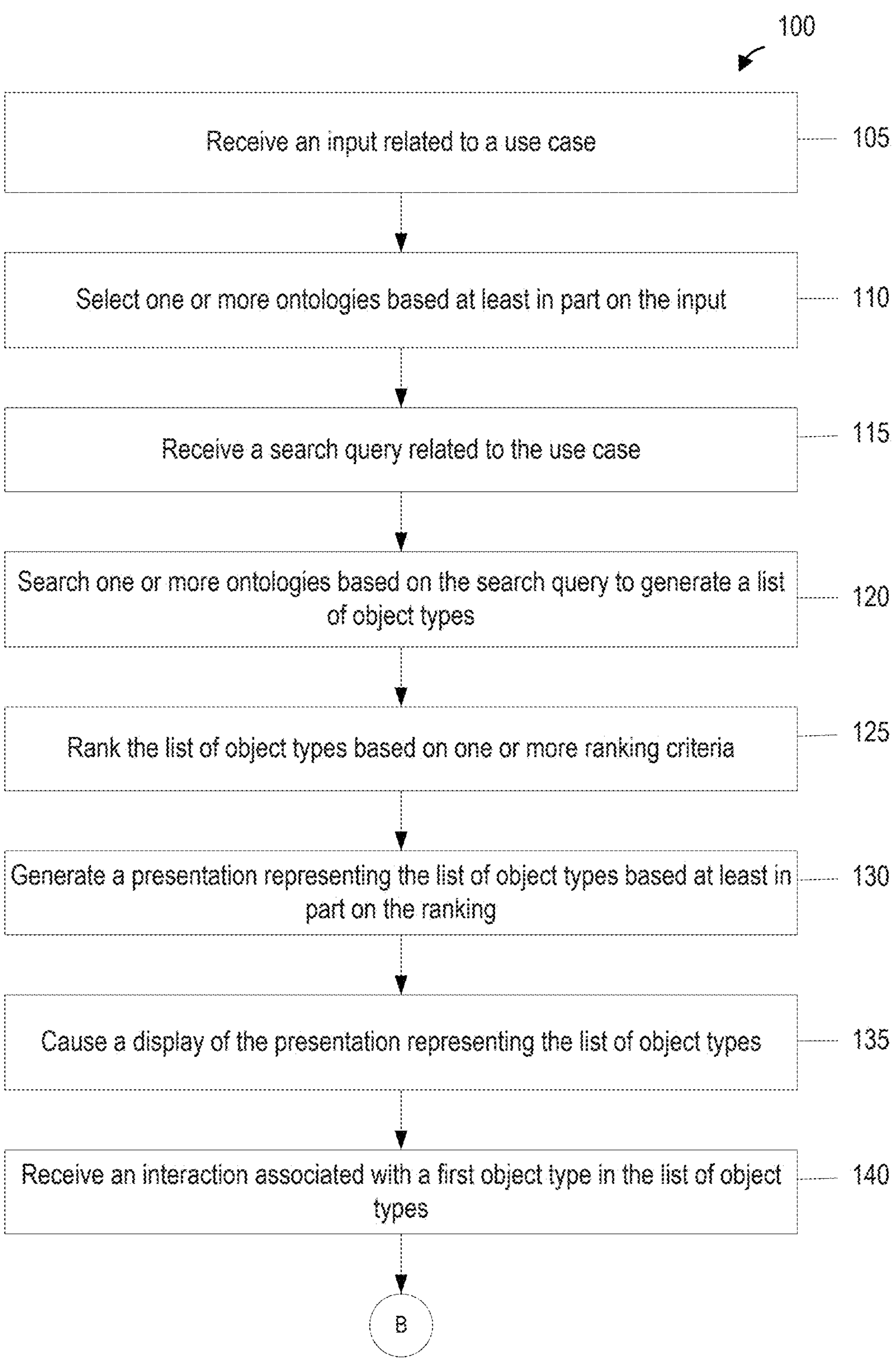
FIG. 1A and FIG. 1B is a simplified diagram showing a method for managing, selecting, and using object types according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any number within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Conventional systems and methods often lack tools to use complex object models efficiently. In some examples, traditional object model management tools have limitations in handling the increasing complexity and scale of object hierarchies in software systems. For example, to build a software application, the traditional tool may be very slow to load an object type to use and/or load an incorrect object type. Additionally, conventional systems and methods are often lack of a way to manage complex object models efficiently and reliably.

Various embodiments of the present disclosure can achieve benefits and/or improvements by using an object type management system to manage, select, and/or use object types of one or more ontologies. In some embodiments, an object type management system includes an object type selector that is a software module or software application for object type management, selection and/or use. In certain embodiments, the object model management system can greatly improve efficiency in searching and identifying an object type, for example, using one or more object models.

According to some embodiments, software systems allow the selection and use of object types to build software applications, for example, using ontologies. In certain embodiments, an ontology refers to a structural framework (e.g., object models) containing information and data related to objects and relationships of objects (e.g., functions applicable to objects, links) within a specific domain (e.g., an organization, an industry). In some embodiments, an action refers to one or more processing logics applied to one or more objects including, for example, creating objects, changing objects, combining objects, linking objects, deleting objects, and/or the like. In certain embodiments, ontologies include object types, action types, and link types, collectively referred to as object types. In certain embodiments, in conventional systems, mature ontologies are difficult to use when the tooling to search and retrieved ontology resources are sparse, lacking information, and/or slow to load.

According to certain embodiments, a software platform can include multiple access points for a user to select an ontology resource to build a software application. In some embodiments, the multiple access points may provide inconsistent output. For example, a first access point (e.g., a search of the object type to build a first software module) of an Airplane object type may return Airplane Object 1 and a second search (e.g., a search of the object type to build a second software module) of the same Airplane object type may return Airplane Object 2. As an example, Airplane Object 1 is used in a software system for an airline company and Airplane Object 2 is used in an airport control system.

According to some embodiments, object search tools may rely on a full ontology load before software builders can select an object type, thus causing large resource consumption (e.g., computing, time, storage, etc.) for larger ontologies. Additionally, in certain examples, the initial load can be long and disruptive when in the middle of workflow.

According to certain embodiments, traditional object search queries or filters match only on object type titles, and object type results are displayed alphabetically rather than in order of relevance. In some embodiments, there is no platform guidance or tooling to help group these resources, so many users rely on naming conventions with brackets or other special characters to indicate that an object type or action is part of a group. In certain embodiments, this makes object types difficult to find and search unless they are uniquely named and the user's query matches the name exactly.

According to certain embodiments, an object model management tool includes one or more object type selectors. In some embodiments, an object type selector refers to a software module that selects and/or presents one or more object types based on a search (e.g., a search query). In certain embodiments, an object type refers to a type of an object, a type of an action, a type of a link, and/or the like. In some embodiments, an action refers to one or more processing logics applied to one or more objects including, for example, creating objects, changing objects, combining objects, linking objects, deleting objects, and/or the like. In some embodiments, a link refers to a relationship between two or more objects. In certain embodiments, an object type selector allows a selection of an object type group from one or more object type groups. In certain embodiments, an object type group refers to a group of related object types. For example, an object type group for "audio" can include "voice" object type, "transcript segment" object type, "device" object type, "linguist review" object type, and/or the like.

In some embodiments, an object type selector includes one or more relevancy algorithms to present object types based on relevancy. In some examples, the relevancy algorithm reflects use history, policy, and/or the like. In certain embodiments, an object type selector can allow faster load times due to loading a subset of the object model. In some embodiments, the object type selector is configured to loading object types in object type groups (e.g., the "airport" group, the "audio" group, etc.). In certain embodiments, the object type groups are generated by users and/or computing models. In some embodiments, object type groups are generated based on use cases. In certain embodiments, the object type groups are presented in a higher priority (e.g., at the top of the user interface). In some embodiments, object type groups are presented before any object types that have not been assigned a group.

In some embodiments, the object type selector presents user-selected object types (e.g., favorites) and/or administrator-select or system-select object types (e.g., prominent object types), before presenting other object types. In some embodiments, at least some of the other object types are presented in groups. In certain embodiments, at least some of the other object types are presented in alphabetical order. In some examples, the object type selector can also rank relevant object types at the top of the list of object types. For example, if a user is in a specific working group (e.g., a workshop), the object type selector ranks object types used by the working group with higher ranks (e.g., object types in the workshop).

According to certain embodiments, in a multi-part selection workflow, the object type selector is configured to use one or more ontologies selected in the initial stages, which can inform filtering for later stages. For example, after selecting a specific object type, the object type selector limits action type searches to those that reference the specific object type. In some embodiments, the object type selector uses an access point (e.g., an application programming interface (API), an indication of a memory location, etc.) to retrieve data. In certain embodiments, the object type selector uses metadata (e.g., names, titles, etc.) to obtain and/or return an object type's identifier, display name, status, icon, and property information and/or the like. In some embodiments, the object type selector can obtain and/or return a plurality of object type data in a short amount of time (e.g., less than 500 milliseconds for 50 object type data).

According to some embodiments, the object type selector orders results by relevance. In certain embodiments, the relevance order uses prefix-matching instead of alphabetical ordering, to provide better object type search results. In some embodiments, other relevance metrics include frequency of use within the platform, platform policy, (e.g., standardized object types, etc.), visibility status, relevancy based on previous selections, and/or the like.

According to certain embodiments, the object model management system (e.g., an object type selector) can include one or more computing models (e.g., one or more artificial intelligence (AI) models), also referred to as query models, for generating and/or modifying one or more search queries. In some embodiments, a model, also referred to as a computing model, includes a model to process data. A model includes, for example, an artificial intelligence (AI) model, a machine learning (ML) model, a deep learning (DL) model, an image processing model, an algorithm, a rule, other computing models, and/or a combination thereof. In certain embodiments, a query AI model can generate and/or modify search queries for object types.

In certain examples, a query AI model can include training data (e.g., a part of training corpus) embedded in the model. In some embodiments, the query AI model includes a generative AI (artificial intelligence) model with training data embedded in the model. In certain embodiments, a generative AI model is a type of AI model that can be used to produce various type of content, such as text, images, videos, audio, 3D (three-dimensional) data, 3D models, and/or the like. In some embodiments, a language model or a large language model (LLM), which is a type of generative AI models, includes content and training data embedded in the model.

According to some embodiments, the query AI model (e.g., a language model, an LLM, etc.) can be trained using selected corpus (e.g., historical inputs, historical search queries, historical object models, historical prompt structures, historical object types, historical object type groups, etc.). In certain embodiments, the query AI model is configured to generate one or more search queries to identify, search, and/or select object types based on inputs. In some embodiments, the query AI model is configured to generate one or more search results based on search queries. In some embodiments, the query AI model includes a language model ("LM") that may include an algorithm, rule, model, and/or other programmatic instructions that can predict the probability of a sequence of words or expressions (e.g., textual queries, summary, text strings, software code). In some embodiments, a language model may, given a starting text string (e.g., one or more words), predict the next word or expression in the sequence. In certain embodiments, a language model may calculate the probability of different word combinations and/or software code based on the patterns learned during training (based on a set of text data from books, articles, websites, audio files, software code, etc.).

In some embodiments, a language model may generate many combinations of one or more next words and/or expressions that are coherent and contextually relevant. In certain embodiments, a language model can be an artificial intelligence model that has been trained to understand, generate, and manipulate language (e.g., computing language expressions). In some embodiments, a language model can be useful for natural language processing, including receiving natural language prompts and providing natural language responses based on the text on which the model is trained. In certain embodiments, a language model may include an n-gram, exponential, positional, neural network, and/or other type of model. In some embodiments, a language model can be used to generate software code.

In certain embodiments, the query AI model includes a large language model (LLM), which was trained on a larger data set and has a larger number of parameters (e.g., billions of parameters) compared to a regular language model. In certain embodiments, an LLM can understand more complex textual inputs and generate more coherent responses due to its extensive training. In certain embodiments, an LLM can use a transformer architecture that is a deep learning architecture using an attention mechanism (e.g., which inputs deserve more attention than others in certain cases). In some embodiments, a language model includes an autoregressive language model, such as a Generative Pre-trained Transformer 3 (GPT-3) model, a GPT 3.5-turbo model, a Claude model, a command-xlang model, a bidirectional encoder representations from transformers (BERT) model, a pathways language model (PaLM) 2, and/or the like.

Figure 1B:
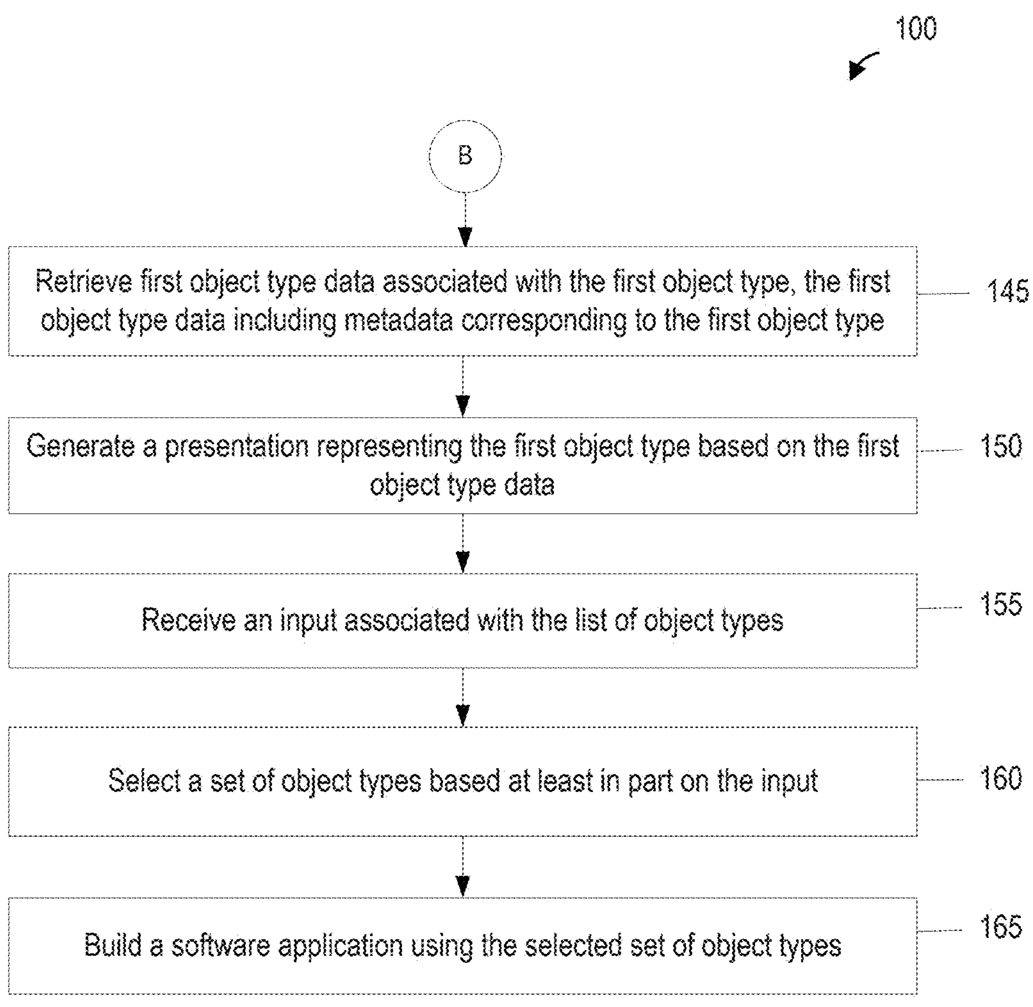

FIG. 1A and FIG. 1B is a simplified diagram showing a method 100 for managing, selecting, and using object types according to certain embodiments of the present disclosure. This diagram is merely an example. One of ordinary skill in the art would recognize many variations, alternatives, and modifications. The method 100 includes processes 105, 110, 115, 120, 125, 130, 135, 140, 145, 150, 155, 160, and 165. Although the above has been shown using a selected group of processes for the method 100 for managing, selecting, and using object types, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

In some embodiments, some or all processes (e.g., steps) of the method 100 are performed by a system (e.g., the computing system 600). In certain examples, some or all processes (e.g., steps) of the method 100 are performed by a computer and/or a processor directed by a code. For example, a computer includes a server computer and/or a client computer (e.g., a personal computer). In some examples, some or all processes (e.g., steps) of the method 100 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to certain embodiments, at process 105, the system receives an input related to a use case (e.g., to generate a software application with specific functionality). In some embodiments, the input includes one or more user inputs. In certain embodiments, the input includes one or more software inputs received from a software interface. In some embodiments, a software interface includes an application programming interface (API), a web service interface, retrieving information from a file, retrieving information from a data repository, and/or the like. In some examples, the system includes an object type selector (e.g., a software service, a software module, a software application) that is integrated another software components. In certain examples, the object type selector includes a plugin software module (e.g., an inline software module). In certain embodiments, the input indicates one or more ontologies. In some embodiments, the input is received via a user interface. In certain embodiments, the input is received via a graphical user interface. In some embodiments, the system presents a list of ontologies on a user interface. In certain embodiments, the input indicates a selection of the one or more ontologies from the list of ontologies. In some embodiments, the input indicates a selection of all of the list of ontologies. In certain embodiments, the input indicates a selection of a plurality of ontologies from the list of ontologies.

According to some embodiments, at process 110, the system selects one or more ontologies based at least in part on the input. In certain examples, the system selects one ontology. In some embodiments, an ontology includes a plurality of object types including a plurality of types of objects, a plurality of types of actions, and a plurality of types of links. In certain embodiments, the one or more ontologies include a first ontology and a second ontology. In some embodiments, the first ontology includes a first object type and the second ontology includes a second object type, where the first object type and the second object type has a same or similar object type name (e.g., "Alert" as the object type name), and where the first object type and the second object type has object structures different from each other. For example, the first object type is the "Alert" object type for the airline ontology and the second object type is the "Alert" object type for the airport ontology. As an example, the first object type includes a first object field (e.g., "distance to destination" field) that is not in the second object type. For example, the first object type and the second object type both include a same third object field (e.g., "message" field). As an example, the second object type includes a second object field (e.g., "city" field) that is not in the first object type.

In some embodiments, the one or more ontologies include one or more object type groups. In certain embodiments, an object type group includes a plurality of object types that are relevant to a specific use case. For example, an object type group is an "Alerting" object type group. In some examples, an object type group includes one or more types of objects, one or more types of actions, and one or more types of links. FIG. 4A is an illustrative example user interface 400A including a presentation representing object type groups 410A, according to some embodiments of the present disclosure. FIG. 4A is merely an example. One of ordinary skill in the art would recognize many variations, alternatives, and modifications. In this example, the object type groups 410A includes an object type group 420A, where the object type group 421A includes a plurality of related object types.

According to certain embodiments, at process 115, the system receives a search query related to the use case. In some embodiments, the system generates a search query based on an input and the context of the input. For example, the system uses the search submitter's information as the context for generating the search query. As an example, the search submitter's information includes organization, industry, security, permission level, and/or the like. In certain embodiments, the system receives a natural language input and generates the search query using a computing model based at least in part on the natural language input. In some embodiments, the natural language input includes voice inputs and/or text inputs. Some embodiments of generating search queries are provided in FIG. 2.

According to some embodiments, at process 120, the system searches the one or more ontologies based on the search query to generate a list of object types. In certain embodiments, the search includes a fuzzy search, which includes object types that meet one or more search criteria. For example, the fuzzy search can find one or more fuzzy matches that meet one or more search criteria. As an example, the search criteria include similarity criteria. For example, the search criteria include a criterion requiring a vector distance between a search term and a target term within a threshold. In some embodiments, the search is conducted using the search query that is generated by a computing model. In some embodiments, the system searches the one or more ontologies using an AI model (e.g., a language model, a large language model, etc.), also referred to as a query AI model, to generate search results based on the search query.

In certain embodiments, at process 125, the system ranks the list of object types based at least in part on one or more ranking criteria. In some embodiments, the ranking criteria include a criterion associated with a policy, a criterion associated with historical data, and a criterion associated with an object type group. In some embodiments, the system uses one or more policies (e.g., rules, organization policies, platform policies, software platform policies, etc.) to identify prominent object types based on and ranks the prominent object types with high-ranking scores using the criteria associated with the one or more policies. In some embodiments, the identified prominent object types are organized alphabetically. In certain embodiments, the system identifies favorite object types based on historical data and ranks the favorite object types with high-ranking scores using the criteria associated with the historical data. For example, an object type last used by the search submitter is identified as a favorite object type. As an example, a first object type used at a first time, by a user or a group of user, has a higher ranking score than a second object type used at a second time that is earlier than the first time. In certain examples, each of the favorite object types has a lower rank score than any of the prominent object types. In some embodiments, the identified favorite object types are organized alphabetically.

In some embodiments, the system identifies relevant object type groups, where each object type group includes a set of pre-selected object types. For example, the object type group includes object types pre-selected by an administrator. As an example, the object type group includes object types pre-selected and/or continuously updated by a computing model (e.g., an AI model).

In some embodiments, the system ranks the object type groups with high-ranking scores based on criteria associated with one or more object type groups. In certain embodiments, the object type groups have lower ranking scores than the prominent object types. In some embodiments, the object type groups have lower ranking scores than the favorite object types. In certain embodiments, the object type groups have higher ranking scores than the other object types that are not prominent object types or favorite object types. In some embodiments, the other object types are sorted alphabetically. In certain embodiments, the list of object types are organized in an order according to one or more ranking criteria. In some embodiments, the one or more ranking criteria include a relevance criteria (e.g., using a relevance score).

Figure 4B:
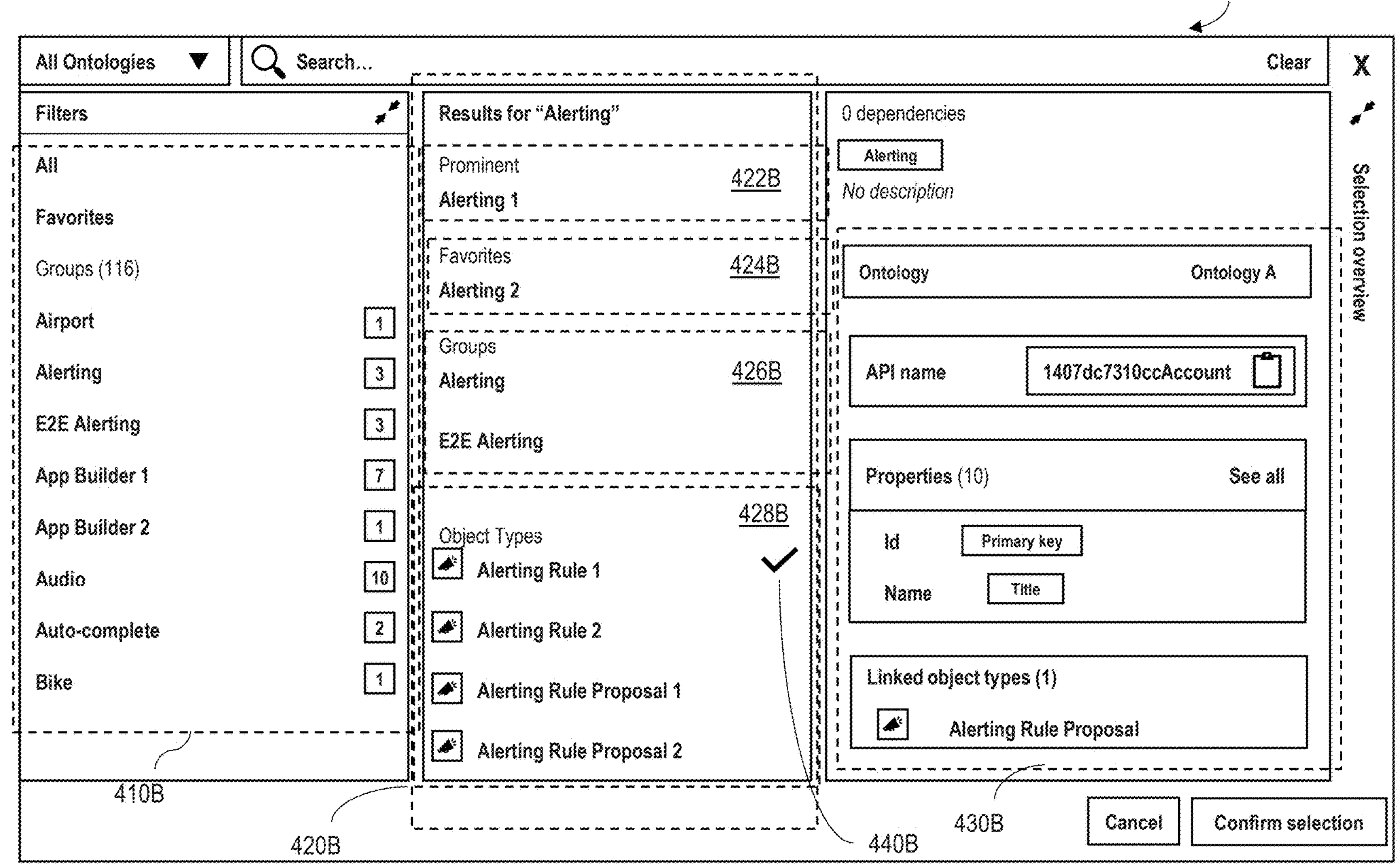
FIG. 4B is an illustrative example user interface presenting a list of object types, according to some embodiments of the present disclosure.

According to certain embodiments, at process 130, the system generates a presentation representing the list of object types based at least in part on the ranking. In some embodiments, at process 135, the system causes a display of the presentation representing the list of object types. FIG. 4B is an illustrative example user interface 400B presenting a list of object types, according to some embodiments of the present disclosure. FIG. 4B is merely an example. One of ordinary skill in the art would recognize many variations, alternatives, and modifications. In this example, the user interface 400B includes a filter selection section 410B and the object type section 420B. As an example, the object type section 420B includes a section of prominent object types 422B, a section of favorite object types 424B, a section of object type groups 426B and a section of other object types 428B. In some examples, the object type section 420B takes inputs 440B indicating one or more selections.

According to some embodiments, the system only retrieves, obtains and/or loads object type names (e.g., titles) of the list of object types. For example, by obtaining names only, the system greatly reduces the time for searching and/or retrieving data from the one or more ontologies. In certain embodiments, the system generates the presentation representing the list of object types based at least in part on the object type names.

According to certain embodiments, at process 140, the system receives an interaction (e.g., a selection, an input, etc.) associated with a first object type in the list of object types. In some examples, the interaction is received via the user interface (e.g., audio, visual, text, etc.). In some examples, the interaction is received via the graphical user interface. In some embodiments, at process 145, the system retrieves (e.g., downloads, retrieves from a data repository, etc.) first object type data associated with the first object type, where the first object type data includes metadata corresponding to the first object type. In certain embodiments, the system retrieves the first object type data in response to receiving the interaction.

In certain embodiments, at process 150, the system generates a presentation representing the first object type based on the first object type data. In certain examples, the metadata includes ontology information (e.g., the associated ontology), interface information, one or more object type properties (e.g., object fields, etc.), one or more linked object types, and/or the like. In some embodiments, the ontology information indicates which ontology the object type is a part of. In certain embodiments, the interface information includes information on how to access the object type, for example, API information. In some embodiments, the linked object types indicate one or more additional object types are required for the use of the first object type. FIGS. 4A and 4B illustrate the object type metadata sections 430A and 430B. In the examples, the object type metadata includes the ontology information, interface information, object type properties, linked object types, and/or the like.

According to some embodiments, at process 155, the system receives an input associated with the list of object types. In certain embodiments, the input is received via the user interface. In some embodiments, the input is received via the graphical user interface (e.g., the input 440B in FIG. 4B). In certain embodiments, at process 160, the system selects a set of object types based at least in part on the input. In some embodiments, at process 165, the system builds a software application using the selected set of object types. In certain embodiments, where the selected set of object types include a selected object type group, the system builds the software application using at least one object type in the selected object type groups. In some embodiments, where the selected set of object types include a selected object type group, the system builds the software application using all object types in the selected object type group.

According to certain embodiments, the system for object model management and/or one or more components of the system, referred to as an object type selector, can be implemented as a plugin (e.g., inline software module) to be integrated with another software application and/or software component. In some embodiments, a plugin refers to a software module implementing certain functionality to be integrated with another software module or software. In certain embodiments, the object type selector as a plugin module has a simpler interface than a standalone object type selector application. In some embodiments, the object type selector as a plugin module is more lightweight than a standalone object type selector application.

Figure 2:
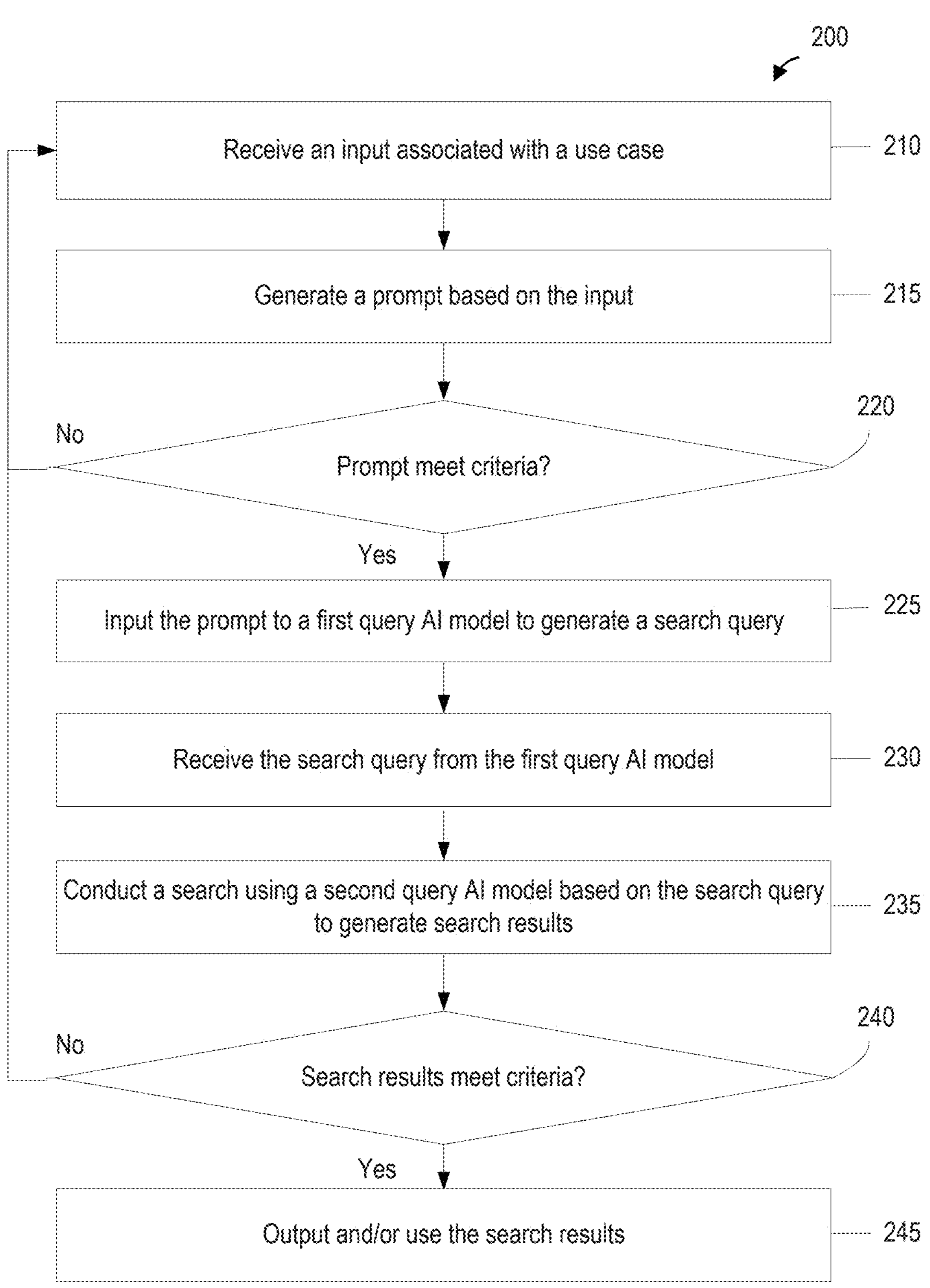
FIG. 2 is a simplified diagram showing a method for search query and/or searching using an AI model according to certain embodiments of the present disclosure.

FIG. 2 is a simplified diagram showing a method 200 for search query and/or searching using an AI model according to certain embodiments of the present disclosure. This diagram is merely an example. One of ordinary skill in the art would recognize many variations, alternatives, and modifications. The method 200 includes processes 210, 215, 220, 225, 230, 235, 240, and 245. Although the above has been shown using a selected group of processes for the method 200, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

In some embodiments, some or all processes (e.g., steps) of the method 200 are performed by a system (e.g., the computing system 600). In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to certain embodiments, at process 210, the system receives an input associated with a use case. In some embodiments, the input includes textual, audio, and interactive (e.g., selection) input received via a user interface. In certain embodiments, the input includes textual, audio, and interactive (e.g., selection) input received via a software interface. For example, the input includes a description of the use case. As an example, the input includes a description of an object type group.

According to some embodiments, at process 215, the system generates a prompt based on the input. In certain embodiments, the prompt has a predetermined structure. In some embodiments, at process 220, the system checks whether the prompt meets one or more criteria. For example, the system determines whether the prompt includes required information. If the prompt does not meet the one or more criteria, in some embodiments, the system will go back to the process 210 to request additional input. If the prompt meets the one or more criteria, in certain embodiments, the system will go to process 225.

According to certain embodiments, at process 225, the system inputs the prompt to a first query AI model to generate a search query. In some embodiments, the first query AI model includes an LLM. In certain embodiments, the first query AI model is designed to generate search queries for identifying object types. In some embodiments, the first query AI model is trained using historical audio input, historical textual input, historical search queries, historical prompt structures, historical use cases, and/or the like.

According to some embodiments, at process 230, the system receives the search query from the first query AI model. In certain embodiments, at process 235, the system conducts a search using a second query AI model based on the search query. In some embodiments, the second query AI model includes an LLM. In certain embodiments, the second query AI model is designed to generate search results including one or more object types and/or one or more object type groups. In some embodiments, the second query AI model is trained using historical search queries, historical search results, historical prompt structures, historical use cases, historical object types, historical object type groups, historical policies, historical object type use data, and/or the like.

According to certain embodiments, at process 240, the system evaluates whether the search results meet one or more criteria. For example, the system evaluates whether the search results meet one or more policy requirements. As an example, the system determines whether certain prominent object types are included in the search results. If the search results do not meet the one or more criteria, in some examples, the system goes back to process 210. If the search results meet the one or more criteria, in certain examples, the system goes to process 245. In some embodiments, at process 245, the system outputs and/or uses the search results.

Figure 3:
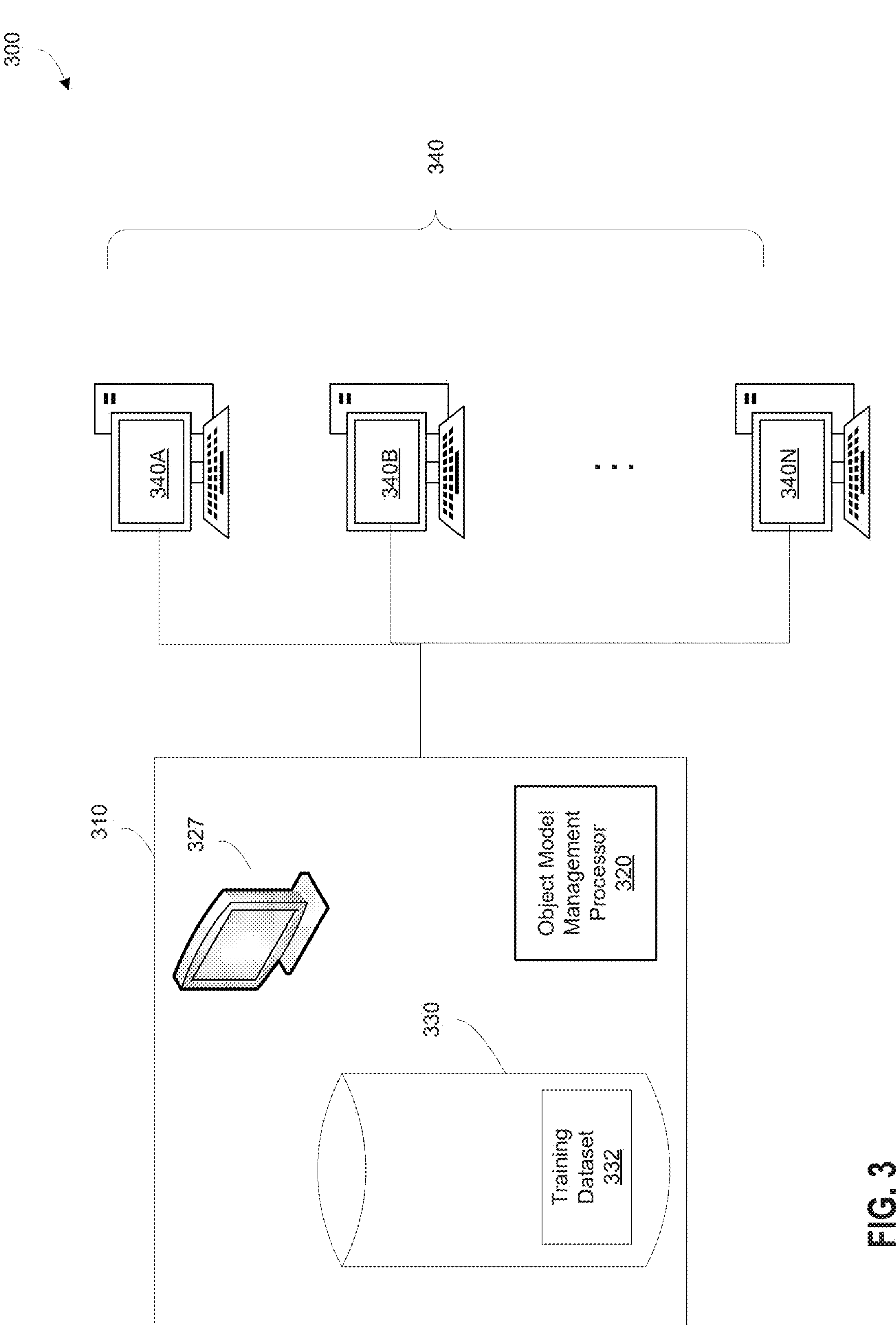
FIG. 3 is an illustrative object model management environment according to certain embodiments of the present disclosure.

FIG. 3 is an illustrative object model management environment 300 according to certain embodiments of the present disclosure. FIG. 3 is merely an example. One of ordinary skill in the art would recognize many variations, alternatives, and modifications. In some embodiments, the object model management environment 300 includes one or more object model management systems (e.g., object type selectors) 310 and one or more computing devices 340 (e.g., computing device 340A, computing device 340B, . . . computing device 340N, etc.). In certain embodiments, the object model management system 310 includes one or more object model management processor 320, one or more displays 327, and one or more data repositories 330.

In some embodiments, the one or more data repositories 330 include one or more training datasets 332, for example, for one or more query AI models. In certain embodiments, the computing device 340 may include and/or access at least a part of the functionality of the object model management system 310. Although the above has been shown using a selected group of components in the object model management environment 300, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to certain embodiments, the object model management system 310 (e.g., the object model management processor 320, etc.) receives an input related to a use case (e.g., to generate a software application with specific functionality). In some embodiments, the input includes one or more user inputs. In certain embodiments, the input includes one or more software inputs received from a software interface. In some examples, the input is received from a software running on the computing device 340. In certain examples, the input is received from a user interface provided by computing device 340. In some examples, the input is received from a graphical user interface rendered on the display 327. In some embodiments, a software interface includes an application programming interface (API), a web service interface, retrieving information from a file, retrieving information from a data repository, and/or the like. In some examples, the object model management system 310 (e.g., the object model management processor 320, etc.) includes an object type selector (e.g., a software service, a software module, a software application) that is integrated another software components. In certain embodiments, the input indicates one or more ontologies. In some embodiments, the input is received via a user interface. In certain embodiments, the input is received via a graphical user interface. In some examples, the input is received from a software running on the computing device 340. In certain examples, the input is received from a user interface provided by computing device 340. In some examples, the input is received from a graphical user interface rendered on the display 327. In some embodiments, the object model management system 310 (e.g., the object model management processor 320, etc.) presents a list of ontologies on a user interface. In certain embodiments, the input indicates a selection of the one or more ontologies from the list of ontologies. In some embodiments, the input indicates a selection of all of the list of ontologies. In certain embodiments, the input indicates a selection of a plurality of ontologies from the list of ontologies.

According to some embodiments, the object model management system 310 (e.g., the object model management processor 320, etc.) selects one or more ontologies based at least in part on the input. In certain examples, the object model management system 310 (e.g., the object model management processor 320, etc.) selects one ontology. In some embodiments, an ontology includes a plurality of object types including a plurality of types of objects, a plurality of types of actions, and a plurality of types of links. In certain embodiments, the one or more ontologies include a first ontology and a second ontology. In some embodiments, the first ontology includes a first object type and the second ontology includes a second object type, where the first object type and the second object type has a same or similar object type name (e.g., "Alert" as the object type name), and where the first object type and the second object type has object structures different from each other. For example, the first object type is the "Alert" object type for the airline ontology and the second object type is the "Alert" object type for the airport ontology. As an example, the first object type includes a first object field (e.g., "distance to destination" field) that is not in the second object type. For example, the first object type and the second object type both include a same third object field (e.g., "message" field). As an example, the second object type includes a second object field (e.g., "city" field) that is not in the first object type.

In some embodiments, the one or more ontologies include one or more object type groups. In certain embodiments, an object type group includes a plurality of object types that are relevant to a specific use case. For example, an object type group is an "Alerting" object type group. In some examples, an object type group includes one or more types of objects, one or more types of actions, and one or more types of links. FIG. 4A is an illustrative example user interface 400A including a presentation representing object type groups 410A, according to some embodiments of the present disclosure. FIG. 4A is merely an example. One of ordinary skill in the art would recognize many variations, alternatives, and modifications. In this example, the object type groups 410A includes an object type group 420A, where the object type group 421A includes a plurality of related object types.

According to certain embodiments, the object model management system 310 (e.g., the object model management processor 320, etc.) receives a search query related to the use case. In some embodiments, the object model management system 310 (e.g., the object model management processor 320, etc.) generates a search query based on an input and the context of the input. For example, the object model management system 310 (e.g., the object model management processor 320, etc.) uses the search submitter's information as the context for generating the search query. As an example, the search submitter's information includes organization, industry, security, permission level, and/or the like. In certain embodiments, the object model management system 310 (e.g., the object model management processor 320, etc.) receives a natural language input and generates the search query using a computing model based at least in part on the natural language input. In some embodiments, the natural language input includes voice inputs and/or text inputs. Some embodiments of generating search queries are provided in FIG. 2.

According to some embodiments, the object model management system 310 (e.g., the object model management processor 320, etc.) searches the one or more ontologies based on the search query to generate a list of object types. In certain embodiments, the search includes a fuzzy search, which includes object types that meet one or more search criteria. For example, the fuzzy search can find one or more fuzzy matches that meet one or more search criteria. As an example, the search criteria include similarity criteria. For example, the search criteria include a criterion requiring a vector distance between a search term and a target term within a threshold. In some embodiments, the search is conducted using the search query that is generated by a computing model. In some embodiments, the object model management system 310 (e.g., the object model management processor 320, etc.) searches the one or more ontologies using an AI model (e.g., a language model, a large language model, etc.), also referred to as a query AI model, to generate search results based on the search query.

In certain embodiments, the object model management system 310 (e.g., the object model management processor 320, etc.) ranks the list of object types based at least in part on one or more ranking criteria. In some embodiments, the ranking criteria include a criterion associated with a policy, a criterion associated with historical data, and a criterion associated with an object type group. In some embodiments, the object model management system 310 (e.g., the object model management processor 320, etc.) uses one or more policies (e.g., organization policies, platform policies, software platform policies, etc.) to identify prominent object types based on and ranks the prominent object types with high-ranking scores using the criteria associated with the one or more policies. In some embodiments, the identified prominent object types are organized alphabetically. In certain embodiments, the object model management system 310 (e.g., the object model management processor 320, etc.) identifies favorite object types based on historical data and ranks the favorite object types with high-ranking scores using the criteria associated with the historical data. For example, an object type last used by the search submitter is identified as a favorite object type. As an example, a first object type used at a first time, by a user or a group of user, has a higher ranking score than a second object type used at a second time that is earlier than the first time. In certain examples, each of the favorite object types has a lower rank score than any of the prominent object types. In some embodiments, the identified favorite object types are organized alphabetically.

In some embodiments, the object model management system 310 (e.g., the object model management processor 320, etc.) identifies relevant object type groups, where each object type group includes a set of pre-selected object types. For example, the object type group includes object types pre-selected by an administrator. As an example, the object type group includes object types pre-selected and/or continuously updated by a computing model (e.g., an AI model).

In some embodiments, the object model management system 310 (e.g., the object model management processor 320, etc.) ranks the object type groups with high-ranking scores based on criteria associated with one or more object type groups. In certain embodiments, the object type groups have lower ranking scores than the prominent object types. In some embodiments, the object type groups have lower ranking scores than the favorite object types. In certain embodiments, the object type groups have higher ranking scores than the other object types that are not prominent object types or favorite object types. In some embodiments, the other object types are sorted alphabetically. In certain embodiments, the list of object types are organized in an order according to one or more ranking criteria. In some embodiments, the one or more ranking criteria include a relevance criteria (e.g., using a relevance score).

According to certain embodiments, the object model management system 310 (e.g., the object model management processor 320, etc.) generates a presentation representing the list of object types based at least in part on the ranking. In some embodiments, the object model management system 310 (e.g., the object model management processor 320, etc.) causes a display of the presentation representing the list of object types. FIG. 4B is an illustrative example user interface 400B presenting a list of object types, according to some embodiments of the present disclosure. FIG. 4B is merely an example. One of ordinary skill in the art would recognize many variations, alternatives, and modifications. In this example, the user interface 400B includes a filter selection section 410B and the object type section 420B. As an example, the object type section 420B includes a section of prominent object types 422B, a section of favorite object types 424B, a section of object type groups 426B and a section of other object types 428B. In some examples, the object type section 420B takes inputs 440B indicating one or more selections.

According to some embodiments, the object model management system 310 (e.g., the object model management processor 320, etc.) only retrieves, obtains and/or loads object type names (e.g., titles) of the list of object types. For example, by obtaining names only, the object model management system 310 (e.g., the object model management processor 320, etc.) greatly reduces the time for searching and/or retrieving data from the one or more ontologies. In certain embodiments, the object model management system 310 (e.g., the object model management processor 320, etc.) generates the presentation representing the list of object types based at least in part on the object type names.

According to certain embodiments, the object model management system 310 (e.g., the object model management processor 320, etc.) receives an interaction (e.g., a selection, an input, etc.) associated with a first object type in the list of object types. In some examples, the interaction is received via the user interface (e.g., audio, visual, text, etc.). In some examples, the interaction is received via the graphical user interface. In some examples, the interaction is received from a software running on the computing device 340. In certain examples, the interaction is received from a user interface provided by computing device 340. In some examples, the interaction is received from a graphical user interface rendered on the display 327. In some embodiments, the object model management system 310 (e.g., the object model management processor 320, etc.) retrieves (e.g., downloads, retrieves from a data repository, etc.) first object type data associated with the first object type, where the first object type data includes metadata corresponding to the first object type.

In certain embodiments, the object model management system 310 (e.g., the object model management processor 320, etc.) generates a presentation representing the first object type based on the first object type data. In certain examples, the metadata includes ontology information (e.g., the associated ontology), interface information, one or more object type properties (e.g., object fields, etc.), one or more linked object types, and/or the like. In some embodiments, the ontology information indicates which ontology the object type is a part of. In certain embodiments, the interface information includes information on how to access the object type, for example, API information. In some embodiments, the linked object types indicate one or more additional object types are required for the use of the first object type. FIGS. 4A and 4B illustrate the object type metadata sections 430A and 430B. In the examples, the object type metadata includes the ontology information, interface information, object type properties, linked object types, and/or the like.

According to some embodiments, the object model management system 310 (e.g., the object model management processor 320, etc.) receives an input associated with the list of object types. In certain embodiments, the input is received via the user interface. In some embodiments, the input is received via the graphical user interface (e.g., the input 440B in FIG. 4B). In some examples, the input is received from a software running on the computing device 340. In certain examples, the input is received from a user interface provided by computing device 340. In some examples, the input is received from a graphical user interface rendered on the display 327. In certain embodiments, the object model management system 310 (e.g., the object model management processor 320, etc.) selects a set of object types based at least in part on the input. In some embodiments, the object model management system 310 (e.g., the object model management processor 320, etc.) builds a software application using the selected set of object types. In certain embodiments, where the selected set of object types includes a selected object type group, the object model management system 310 (e.g., the object model management processor 320, etc.) builds the software application using at least one object type in the selected object type groups. In some embodiments, where the selected set of object types includes a selected object type group, the object model management system 310 (e.g., the object model management processor 320, etc.) builds the software application using all object types in the selected object type group.

According to certain embodiments, the object model management system 310 (e.g., the object model management processor 320, etc.) for object model management and/or one or more components of the object model management system 310 (e.g., the object model management processor 320, etc.), referred to as an object type selector, can be implemented as a plugin (e.g., inline software module) to be integrated with another software application and/or software component. In some embodiments, a plugin refers to a software module implementing certain functionality to be integrated with another software module or software. In certain embodiments, the object type selector as a plugin module has a simpler interface than a standalone object type selector application. In some embodiments, the object type selector as a plugin module is more lightweight than a standalone object type selector application.

In some embodiments, the one or more repositories 330 can include one or more training datasets 332, one or more query AI models, one or more parameters and weight values for the one or more query AI models, one or more object models, one or more object types, one or more object type groups, one or more inputs, one or more search queries, and/or the like. The repository may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the object model management environment 300 can execute software or firmware stored in non-transitory computer-readable medium to implement various processing steps. Various components and processors of the object model management environment 300 can be implemented by one or more computing devices including, but not limited to, circuits, a computer, a cloud-based processing unit, a processor, a processing unit, a microprocessor, a mobile computing device, and/or a tablet computer. In some cases, various components referenced by the object model management environment 300 (e.g., the one or more object model management systems 310, the one or more object model management processor 320, the one or more computing devices 340, etc.) can be implemented on a shared computing device. Alternatively, a component of the object model management environment 300 can be implemented on multiple computing devices. In some implementations, various modules and components referenced by the object model management environment 300 can be implemented as software, hardware, firmware, or a combination thereof. In some cases, various components referenced by the object model management environment 300 can be implemented in software or firmware executed by a computing device.

Various components referenced by object model management environment 300 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as an intranet, or on a public computer network, such as the Internet.

Figure 5:
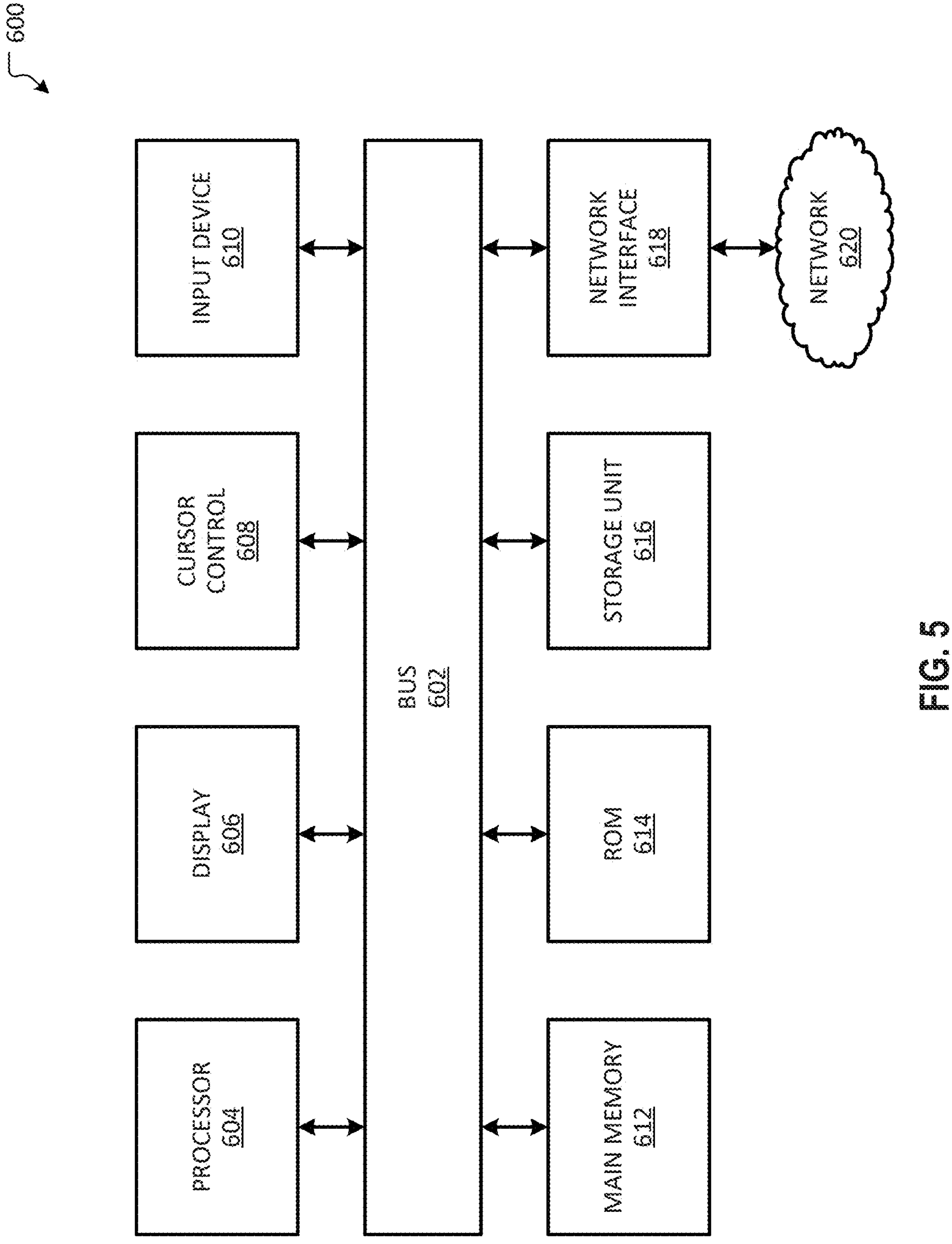
FIG. 5 is a simplified diagram showing a computing system for implementing a system for object model management and/or use in accordance with at least one example set forth in the disclosure.

FIG. 5 is a simplified diagram showing a computing system for implementing a system 600 for object model management and/or use in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the methods (e.g., the method 100, the method 200, etc.) and processes described in the present disclosure are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For example, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to certain embodiments, a method for selecting object types, the method comprising: receiving a search query related to a use case; searching one or more ontologies based on the search query to generate a list of object types, the list of object types including one or more object type groups, each object type group of the one or more object type groups including a set of pre-selected object types; ranking the list of object types based on one or more ranking criteria; generating a presentation representing the list of object types based at least in part on the ranking; and causing a display of the presentation representing the list of object types; wherein the method is performed by one or more processors. For example, the method is implemented according to at least FIG. 1A, FIG. 1B, FIG. 2, FIG. 3, FIG. 4A, and/or FIG. 4B.

In some embodiments, the list of object types further includes at least one selected from a group consisting of one or more prominent object types and one or more favorite object types, wherein the one or more prominent object types are identified based on one or more policies, wherein the one or more favorite object types are identified based on historical data. In certain embodiments, the ranking criteria include at least one selected from a group consisting of a criterion associated with a policy, a criterion associated with historical data, and a criterion associated with an object type group. In some embodiments, the generating a presentation representing the list of object types includes: retrieving object type names associated with the list of object types; and generating the presentation representing the list of object types based at least in part on the object type names. In certain embodiments, the method further comprises: receiving an interaction with a first object type in the list of object types; retrieving first object type data associated with the first object type, the first object type data including metadata corresponding to the first object type; and generating a presentation representing the first object type based on the first object type data.

In certain embodiments, the first object type data includes at least one selected from a group consisting of ontology information, interface information, one or more object type properties, one or more action types associated with the first object type, and one or more linked objected types. In some embodiments, the method further comprises: receiving a user input related to the use case; and selecting the one or more ontologies based at least in part on the user input. In certain embodiments, the presentation of the list of object types includes representation of the one or more prominent object types being presented on a top of the presentation of the list of object types. In some embodiments, the method further comprises: receiving an input associated with the list of object types; and selecting a set of object types from the list of object types based at least in part on the input. In certain embodiments, the method further comprises: building a software application using the selected set of object types.

In some embodiments, the selected set of object types include a selected object type group, wherein the building a software application using the selected set of object types includes building the software application using at least one object type in the selected object type groups. In certain embodiments, the method is performed by an inline software module to be integrated into a software application. In some embodiments, the receiving a search query includes: receiving a natural language input; and generating the search query using a computing model based at least in part on the natural language input. In certain embodiments, the computing model includes a large language model.

According to some embodiments, a system for selecting object types, the system comprising: one or more memories comprising instructions stored thereon; and one or more processors configured to execute the instructions and perform operations comprising: receiving a search query related to a use case; searching one or more ontologies based on the search query to generate a list of object types, the list of object types including one or more object type groups, each object type group of the one or more object type groups including a set of pre-selected object types; ranking the list of object types based on one or more ranking criteria; generating a presentation representing the list of object types based at least in part on the ranking; and causing a display of the presentation representing the list of object types. For example, the system is implemented according to at least FIG. 1A, FIG. 1B, FIG. 2, FIG. 3, FIG. 4A, and/or FIG. 4B.

In some embodiments, the list of object types further includes at least one selected from a group consisting of one or more prominent object types and one or more favorite object types, wherein the one or more prominent object types are identified based on one or more policies, wherein the one or more favorite object types are identified based on historical data. In certain embodiments, the ranking criteria include at least one selected from a group consisting of a criterion associated with a policy, a criterion associated with historical data, and a criterion associated with an object type group. In some embodiments, the generating a presentation representing the list of object types includes: retrieving object type names associated with the list of object types; and generating the presentation representing the list of object types based at least in part on the object type names. In certain embodiments, the operations further comprise: receiving an interaction with a first object type in the list of object types; retrieving first object type data associated with the first object type, the first object type data including metadata corresponding to the first object type; and generating a presentation representing the first object type based on the first object type data.

In certain embodiments, the first object type data includes at least one selected from a group consisting of ontology information, interface information, one or more object type properties, one or more action types associated with the first object type, and one or more linked objected types. In some embodiments, the operations further comprise: receiving a user input related to the use case; and selecting the one or more ontologies based at least in part on the user input. In certain embodiments, the presentation of the list of object types includes representation of the one or more prominent object types being presented on a top of the presentation of the list of object types. In some embodiments, the operations further comprise: receiving an input associated with the list of object types; and selecting a set of object types from the list of object types based at least in part on the input. In certain embodiments, the operations further comprise: building a software application using the selected set of object types.

In some embodiments, the selected set of object types include a selected object type group, wherein the building a software application using the selected set of object types includes building the software application using at least one object type in the selected object type groups. In certain embodiments, the operations are performed by an inline software module to be integrated into a software application. In some embodiments, the receiving a search query includes: receiving a natural language input; and generating the search query using a computing model based at least in part on the natural language input. In certain embodiments, the computing model includes a large language model.

According to certain embodiments, a non-transitory computer-readable storage medium having instructions for selecting object types that, when executed by one or more processors, cause the one or more processors to perform operations comprising: receiving a search query related to a use case; searching one or more ontologies based on the search query to generate a list of object types, the list of object types including one or more object type groups, each object type group of the one or more object type groups including a set of pre-selected object types; ranking the list of object types based on one or more ranking criteria; generating a presentation representing the list of object types based at least in part on the ranking; and causing a display of the presentation representing the list of object types. For example, the non-transitory computer-readable storage medium is implemented according to at least FIG. 1A, FIG. 1B, FIG. 2, FIG. 3, FIG. 4A, and/or FIG. 4B.

In some embodiments, the list of object types further includes at least one selected from a group consisting of one or more prominent object types and one or more favorite object types, wherein the one or more prominent object types are identified based on one or more policies, wherein the one or more favorite object types are identified based on historical data. In certain embodiments, the ranking criteria include at least one selected from a group consisting of a criterion associated with a policy, a criterion associated with historical data, and a criterion associated with an object type group. In some embodiments, the generating a presentation representing the list of object types includes: retrieving object type names associated with the list of object types; and generating the presentation representing the list of object types based at least in part on the object type names. In certain embodiments, the operations further comprise: receiving an interaction with a first object type in the list of object types; retrieving first object type data associated with the first object type, the first object type data including metadata corresponding to the first object type; and generating a presentation representing the first object type based on the first object type data.

In certain embodiments, the first object type data includes at least one selected from a group consisting of ontology information, interface information, one or more object type properties, one or more action types associated with the first object type, and one or more linked objected types. In some embodiments, the operations further comprise: receiving a user input related to the use case; and selecting the one or more ontologies based at least in part on the user input. In certain embodiments, the presentation of the list of object types includes representation of the one or more prominent object types being presented on a top of the presentation of the list of object types. In some embodiments, the operations further comprise: receiving an input associated with the list of object types; and selecting a set of object types from the list of object types based at least in part on the input. In certain embodiments, the operations further comprise: building a software application using the selected set of object types.

In some embodiments, the selected set of object types include a selected object type group, wherein the building a software application using the selected set of object types includes building the software application using at least one object type in the selected object type groups. In certain embodiments, the operations are performed by an inline software module to be integrated into a software application. In some embodiments, the receiving a search query includes: receiving a natural language input; and generating the search query using a computing model based at least in part on the natural language input. In certain embodiments, the computing model includes a large language model.

For example, some or all components referenced by various embodiments of the present disclosure each are, individually and/or in combination with at least another component, implemented using one or more software components, one or more hardware components, and/or one or more combinations of software and hardware components. In another example, some or all components referenced by various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components referenced by the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for selecting object types, the method comprising:

receiving a search query related to a use case;

searching one or more ontologies based on the search query to generate a list of object types, the list of object types including one or more object type groups, the one or more object type groups including a first object type group and a second object type group, the first object type group including a plurality of first pre-selected object types, the second object type group including a plurality of second pre-selected object types, the first object type group being different from a second object type group;

ranking the list of object types based on one or more ranking criteria;

generating a presentation representing the list of object types based at least in part on the ranking, the presentation including a representation of a first object type selected from the first object type group and a representation of a second object type selected from the second object type group; and causing a display of the presentation representing the list of object types;

wherein the method is performed by one or more processors.

2. The method of claim 1, wherein the list of object types further includes at least one selected from a group consisting of one or more prominent object types and one or more favorite object types, wherein the one or more prominent object types are identified based on one or more policies, wherein the one or more favorite object types are identified based on historical data.

3. The method of claim 2, wherein the presentation of the list of object types includes representation of the one or more prominent object types being presented at a top of the presentation of the list of object types.

4. The method of claim 1, wherein the one or more ranking criteria include at least one selected from a group consisting of a criterion associated with a policy, a criterion associated with historical data, and a criterion associated with an object type group.

5. The method of claim 1, wherein the generating a presentation representing the list of object types includes:

retrieving a list of object type names corresponding to the list of object types; and generating the presentation representing the list of object types based at least in part on the list of object type names.

6. The method of claim 5, further comprising:

receiving an interaction with a first object type in the list of object types;

retrieving first object type data associated with the first object type, the first object type data including metadata corresponding to the first object type; and generating a presentation representing the first object type based on the first object type data.

7. The method of claim 6, wherein the first object type data includes at least one selected from a group consisting of ontology information, interface information, one or more object type properties, one or more action types associated with the first object type, and one or more linked objected types.

8. The method of claim 1, further comprising:

receiving a user input related to the use case; and selecting the one or more ontologies based at least in part on the user input.

9. The method of claim 1, further comprising:

receiving an input associated with the list of object types; and selecting a set of object types from the list of object types based at least in part on the input.

10. The method of claim 9, further comprising:

building a software application using the selected set of object types.

11. The method of claim 10, wherein the selected set of object types include a selected object type group, wherein the building a software application using the selected set of object types includes building the software application using at least one object type in the selected object type groups.

12. The method of claim 1, wherein the method is performed by an inline software module to be embedded into a software application.

13. The method of claim 1, wherein the receiving a search query includes:

receiving a natural language input; and generating the search query using a computing model based at least in part on the natural language input.

14. The method of claim 13, wherein the computing model includes a large language model.

15. A system for selecting object types, the system comprising:

one or more memories comprising instructions stored thereon; and one or more processors configured to execute the instructions and perform operations comprising:

receiving a search query related to a use case;

searching one or more ontologies based on the search query to generate a list of object types, the list of object types including one or more object type groups, the one or more object type groups including a first object type group and a second object type group, the first object type group including a plurality of first pre-selected object types, the second object type group including a plurality of second pre-selected object types, the first object type group being different from a second object type group;

ranking the list of object types based on one or more ranking criteria;

generating a presentation representing the list of object types based at least in part on the ranking, the presentation including a representation of a first object type selected from the first object type group and a representation of a second object type selected from the second object type group; and causing a display of the presentation representing the list of object types.

16. The system of claim 15, wherein the list of object types further includes at least one selected from a group consisting of one or more prominent object types and one or more favorite object types, wherein the one or more prominent object types are identified based on one or more policies, wherein the one or more favorite object types are identified based on historical data.

17. The system of claim 15, wherein the one or more ranking criteria include at least one selected from a group consisting of a criterion associated with a policy, a criterion associated with historical data, and a criterion associated with an object type group.

18. The system of claim 15, wherein the generating a presentation representing the list of object types includes:

retrieving a list of object type names corresponding to the list of object types; and generating the presentation representing the list of object types based at least in part on the list of object type names.

19. The system of claim 18, wherein the operations further comprise:

receiving an interaction with a first object type in the list of object types;

retrieving first object type data associated with the first object type, the first object type data including metadata corresponding to the first object type; and generating a presentation representing the first object type based on the first object type data.

20. A non-transitory computer-readable storage medium having instructions for selecting object types that, when executed by one or more processors, cause the one or more processors to perform operations comprising:

receiving a search query related to a use case;

searching one or more ontologies based on the search query to generate a list of object types, the list of object types including one or more object type groups, the one or more object type groups including a first object type group and a second object type group, the first object type group including a plurality of first pre-selected object types, the second object type group including a plurality of second pre-selected object types, the first object type group being different from a second object type group;

ranking the list of object types based on one or more ranking criteria;

generating a presentation representing the list of object types based at least in part on the ranking, the presentation including a representation of a first object type selected from the first object type group and a representation of a second object type selected from the second object type group; and causing a display of the presentation representing the list of object types.

* * * * *